US011703894B2

(12) United States Patent
Keller et al.

(10) Patent No.: US 11,703,894 B2
(45) Date of Patent: Jul. 18, 2023

(54) CONTROL VALVE

(71) Applicant: BELIMO HOLDING AG, Hinwil (CH)

(72) Inventors: Urs Keller, Hinwil (CH); Marc Thuillard, Uetikon am See (CH)

(73) Assignee: BELIMO HOLDING AG, Hinwil (CH)

( * ) Notice: Subject to any disclaimer, the term of this patent is extended or adjusted under 35 U.S.C. 154(b) by 424 days.

(21) Appl. No.: 16/691,758

(22) Filed: Nov. 22, 2019

(65) Prior Publication Data

US 2020/0166959 A1   May 28, 2020

(30) Foreign Application Priority Data

Nov. 23, 2018  (CH) .................................. 01453/18

(51) Int. Cl.
G05D 23/19 (2006.01)
(52) U.S. Cl.
CPC ................. G05D 23/1919 (2013.01)
(58) Field of Classification Search
CPC .................................................. G05D 23/1919
See application file for complete search history.

(56) References Cited

U.S. PATENT DOCUMENTS

| 6,352,361 B1* | 3/2002 | Nimberger | G01K 1/08 |
| | | | 374/142 |
| 7,631,569 B2* | 12/2009 | Salo | G01B 5/0004 |
| | | | 73/866.5 |
| 2016/0161140 A1* | 6/2016 | Chen | G05D 23/1904 |
| | | | 700/278 |
| 2016/0356026 A1 | 12/2016 | Engler | |

FOREIGN PATENT DOCUMENTS

| DE | 35 08 570 A1 | 9/1985 |
| DE | 37 08 592 A1 | 9/1988 |
| DE | 44 07 689 A1 | 8/1994 |
| EP | 0 200 563 A2 | 11/1986 |
| EP | 1 074 825 A1 | 2/2001 |
| KR | 20160122060 A * | 10/2016 |
| KR | 10-1713132 B1 | 3/2017 |
| WO | 2017/044927 A1 | 3/2017 |
| WO | 2018/005082 A1 | 1/2018 |

OTHER PUBLICATIONS

KR20160122060A Translation (Year: 2016).*
Swiss Search Report of CH 14532018 dated Mar. 12, 2019.

* cited by examiner

*Primary Examiner* — Schyler S Sanks
(74) *Attorney, Agent, or Firm* — Sughrue Mion, PLLC

(57) ABSTRACT

A control valve (2) for regulating a fluid flow in an HVAC comprises a valve body (21) and a temperature sensor (25) configured to measure the temperature of a fluid (24) flowing within the control valve (2). The temperature sensor (25) is arranged such that the temperature sensor (25) is essentially thermally decoupled from the valve body (21).

10 Claims, 5 Drawing Sheets

CONTROL VALVE

TECHNICAL FIELD

The invention relates to a control valve for regulating a fluid flow in an HVAC system, the control valve comprising a valve body and a temperature sensor configured to measure the temperature of a fluid flowing in the control valve.

BACKGROUND OF THE INVENTION

Accurate measurement of the temperature of the fluid in an HVAC system plays an important role for controlling the HVAC system. For example, the heat flow emitted by a heat exchanger to the environment is typically determined by measuring the temperatures at the inlet and the outlet of the heat exchanger. A precise measurement of the temperature is therefore beneficial for various control purposes involving the heat flow in the HVAC system. Further, the precise knowledge of the temperature of the fluid is used to set control valves of the HVAC system to appropriate valve positions in order to regulate the fluid flow.

Therefore, various solutions to measure the temperature of the fluid in an HVAC system have been proposed in the prior art.

For example, WO2006/014712 A2 describes an apparatus and a method for determining the temperature of an operating fluid media in an HVAC system. An integral temperature sensor, mounted within an actuator of an actuator-driven HVAC valve, senses the temperature of a valve body of the HVAC valve. The temperature of a fluid media within the HVAC valve is determined from the temperature of the valve body. A processor within the actuator configures the actuator to function in either a direct acting mode, or alternatively in a reverse acting mode, as a function of the temperature of the valve body as sensed by the integral temperature sensor. The actuator is adapted for attachment to the HVAC valve in such a manner that the temperature sensor is placed in operative thermal contact with the valve body by the act of attaching the actuator to the HVAC valve.

DE4232801 A1 describes a valve for heating or air conditioning systems with a housing, a valve body arranged in the interior of the valve and a temperature sensor which is inserted into the housing. The housing includes for the simplified assembly and for cost reduction purposes a pocket with an opening which is accessible from the outside. The pocket is closed against the valve interior and the temperature sensor is arranged in the pocket. The temperature sensor is therefore not in direct contact with the heat transfer medium.

The various known solutions for measuring the temperature of the fluid in an HVAC system are limited in accuracy and/or efficiency of temperature determination.

SUMMARY OF THE INVENTION

It is an object of the invention to provide a control valve for regulating a fluid flow in an HVAC system with a temperature sensor configured to measure the temperature of the fluid flowing in the control valve, which at least partially improves the prior art and avoids at least part of the disadvantages of the prior art.

According to the present invention, this object is achieved by the features of the independent claim. In addition, further advantageous embodiments follow from the dependent claims and the description.

According to an aspect of the invention, the object is particularly achieved by a control valve for regulating a fluid flow in an HVAC system, the control valve comprising a valve body and a temperature sensor configured to measure the temperature of a fluid flowing in the control valve, wherein the temperature sensor is arranged such that the temperature sensor is essentially thermally decoupled from the valve body.

The arrangement of the temperature sensor provides the advantage that a direct thermal coupling between the temperature sensor and the valve body is avoided. This allows to increase the accuracy of the temperature measurement of the fluid since the influence of the valve body on the temperature measurement can be minimized.

In particular, the temperature sensor may be essentially thermally decoupled from the valve body such that thermal coupling of the temperature sensor can only be established via the 3.o fluid flowing within the control valve. Apart from the fluid which may establish an indirect thermal coupling between the temperature sensor and the valve body, the temperature sensor may therefore be thermally decoupled from the valve body.

In the context of the present invention, the terms "thermally insulating", "thermally decoupled" and "thermally conductive", "thermally coupled" shall describe the respective ranges of the thermal conductivity which are known to the person skilled in the art for characterizing thermally insulating and thermally conducting components as well as thermal coupling and decoupling, respectively. Especially, the term "essentially thermally decoupled" is understood that a residual thermal conductivity from a thermally insulating portion may be neglected.

In an embodiment, the temperature sensor is mounted in the control valve by an at least partially thermally insulating fastener, wherein the contact between the fastener and the valve body is established via a thermally insulating portion of the fastener.

Typically, the valve body comprises a valve housing with a wall and a valve regulating member. The fastener may be partially thermally insulating in that the fastener comprises a thermally insulating portion and a thermally conductive portion. Alternatively, the fastener may completely be made of a thermally insulating material. The thermally insulating portion of the fastener via which the contact between the fastener and the valve body is established, ensures that direct thermal coupling between the temperature sensor and the valve body is avoided.

In an embodiment, the fastener is mounted on or within a wall of the valve body.

In an embodiment, the valve body comprises a valve regulating member and the fastener is mounted on or within the valve regulating member.

In an embodiment, the fastener is mounted on or within a shaft of the valve regulating member.

In variants, the fastener is mounted upstream of the valve regulating member or downstream of the valve regulating member.

In an embodiment, the control valve is a ball valve and the valve regulating member is a ball with a through bore.

In an embodiment, the fastener comprises an adhesive, a foam, a plastic and/or a ceramic.

In an embodiment, the fastener comprises a thermowell configured to receive the temperature sensor.

The thermowell provides the advantage of a fast exchange of a temperature sensor without the need to open the valve.

This is especially advantageous, if the temperature sensor breaks or if a different kind of temperature sensor is required.

In an embodiment, the thermowell comprises a thermally conductive head arranged in an interior space of the valve body, the head being thermally coupled to the temperature sensor.

Advantageously, the thermowell comprises a thermally insulating portion, which can be the part of the thermowell which is proximal to the opening of the thermowell. The thermowell can be mounted within a wall of the valve body, such that only the thermally insulating portion of the thermowell contacts the valve body and thermal coupling of the temperature sensor with the valve body via the thermowell is avoided.

In an embodiment, the temperature sensor is arranged to be in direct contact with the fluid flowing within the control valve.

The direct contact of the temperature sensor with the fluid flowing within the control valve provides the advantage of a fast measurement of the temperature since the influence of the heat capacity of any component arranged between the temperature sensor and the fluid, such as a sleeve or a pocket, can be avoided. Furthermore, the accuracy of the temperature measurement can be increased.

In an embodiment, the control valve comprises a thermally insulating lead-through configured to receive cabling connected to a sensing unit of the temperature sensor.

Typically, the temperature sensor comprises a sensing unit, such as a thermistor or a thermocouple, and an electronic unit for readout and/or amplification. The sensing unit and the electronic unit can spatially be separated with cabling connecting the sensing unit with the electronic unit. The thermally insulating lead-through provides the advantage that the influence of thermal coupling between the cabling and the valve body can be reduced, which is especially advantageous for the case that the signal amplification and/or readout is performed externally, i.e. not directly at the position of the sensing unit.

In an embodiment, the thermally insulating lead-through is arranged within a wall of the valve body or within a shaft of the valve regulating member.

In an embodiment, the temperature sensor comprises a circuit configured for wireless transmission of temperature information (data).

Wireless transmission of temperature information (data) is advantageous since thermal effects from cabling, e.g. for connecting the sensing unit to the electronic unit, can be avoided.

In an embodiment, a portion of the valve body is thermally insulating.

A thermally insulating portion of the valve body provides the advantage that thermal effects of the environment on the measured temperature can be reduced. Advantageously, the fastener is mounted within or on the thermally insulating portion of the wall of the valve body.

In an embodiment, the valve body is thermally insulating.

BRIEF DESCRIPTION OF THE DRAWINGS

The present invention will be explained in more detail, by way of example, with reference to the drawings, in which.

DETAILED DESCRIPTION OF EXEMPLARY EMBODIMENTS

Figure 1:
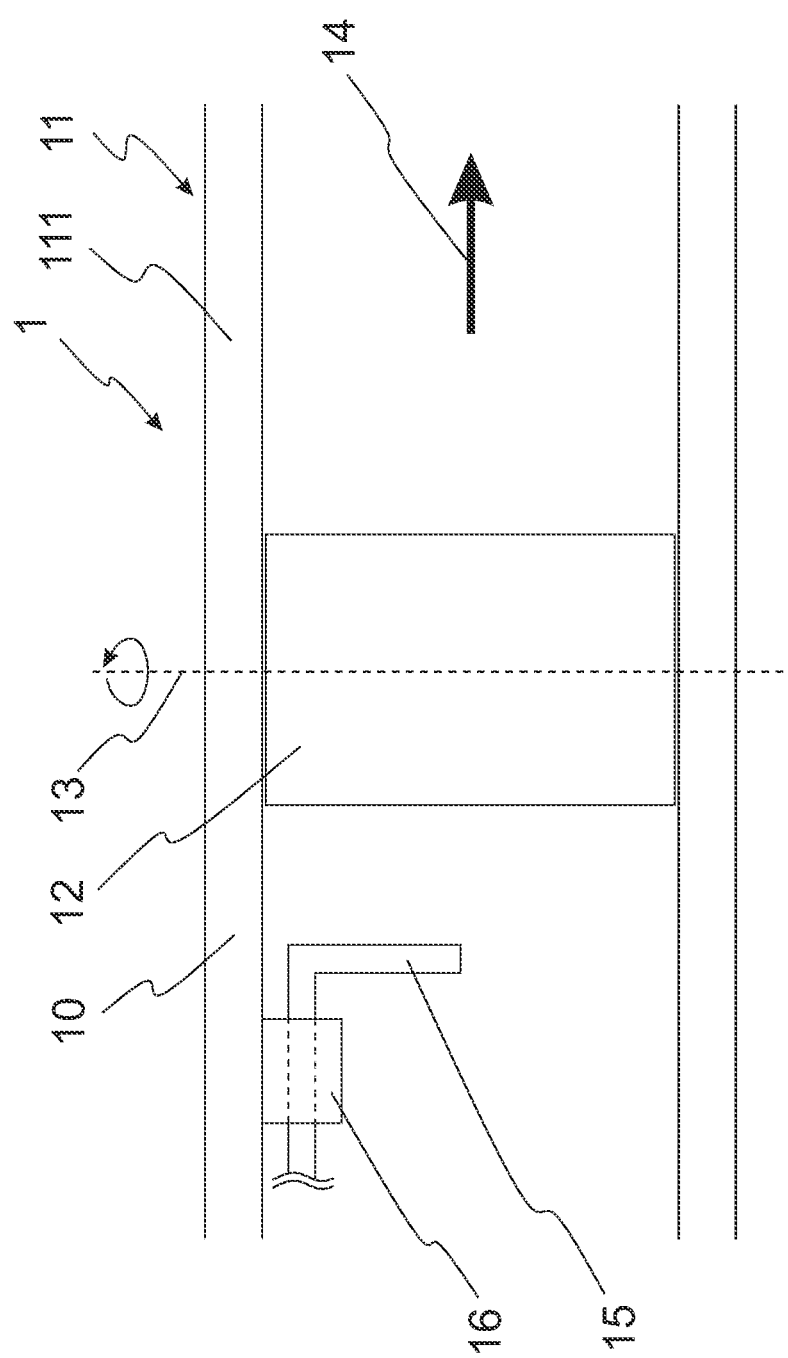
FIG. 1 shows a side cut view of a first embodiment of a control valve.

FIG. 1 shows a schematic side cut view of a first embodiment of a control valve 1 comprising a valve body 11 with a valve housing 10 and a valve regulating member 12. The valve regulating member 12 is adjustable between a closed position and an open position for the fluid flow 14. In the shown embodiment, the valve regulating member 12 is rotatable around an axis of rotation 13 between the closed position and the open position. The valve regulating member 12 can be a ball with a through bore and the control valve 1 a ball valve. In other embodiments, the control valve may be for example a butterfly valve, a gate valve etc. The control valve further comprises a temperature sensor 15 which is mounted on the wall of the valve body 11 by a thermally insulating fastener 16. The temperature sensor 15 is therefore arranged such that the temperature sensor 15 is essentially thermally decoupled from the valve body 11. The fastener 16 is made of a thermally insulating material, such as an adhesive, a foam, a plastic, or a ceramic. In FIG. 1, only a part of the temperature sensor 15 is shown, which is indicated schematically by the two wavy lines at the rear end of the temperature sensor 15. The temperature sensor 15 comprises an angled front part (sensing unit) which extends into the flow 14 for sensing the temperature. The temperature sensor 15 is arranged upstream to the valve regulating member 12. In other embodiments, the temperature sensor 15 may be arranged upstream to the valve regulating member 12 or may be arranged within the valve regulating member 12.

Figure 2:
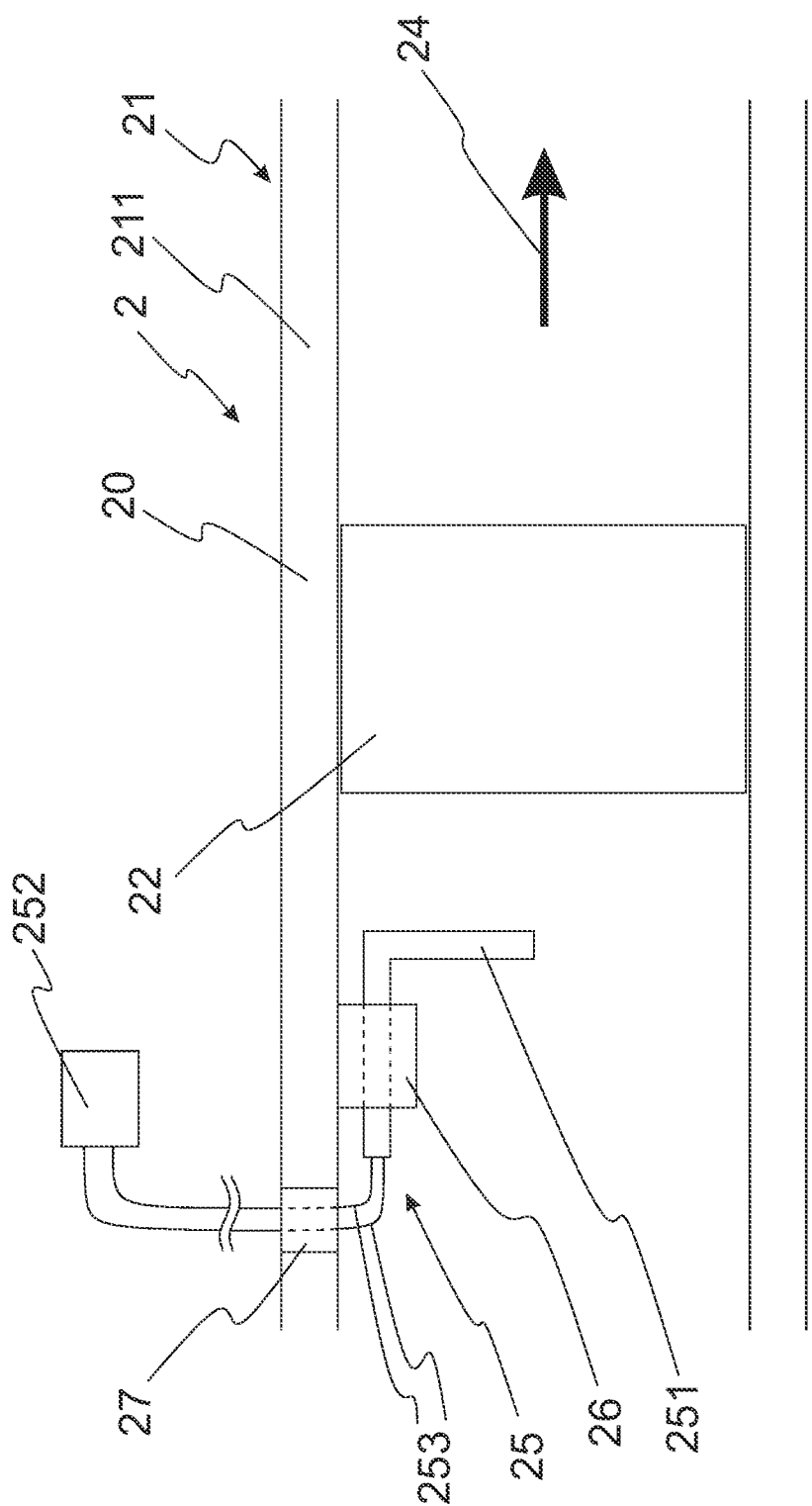
FIG. 2 shows a side cut view of a second embodiment of a control valve.

In an embodiment, the temperature sensor 15 comprises a circuit configured for wireless transmission of temperature data (temperature information) to a processing unit, e.g. an electronic unit 252 comprising an electronic circuit, as illustrated in and described in the context of FIG. 2, and/or another (separate, external) electronic device, particularly a mobile communication device, such as a mobile radio telephone, a smart watch, a tablet computer, or the like. For example, the circuit for wireless transmission comprises an RFID (Radio Frequency Identifier) or BLE (Bluetooth Low Energy) communication circuit or another electronic communication circuit for wireless data transmission over a close range such as up to one, two, five, or ten meters, depending on the application and configuration.

FIG. 2 shows a schematic side view of a second embodiment of a control valve 2 comprising a valve body 21 with a valve housing 20 and a valve regulating member 22. The valve regulating member 22 is adjustable between a closed position and an open position for the fluid flow 24. The control valve 2 further comprises a temperature sensor 25 which is mounted on the wall 211 of the valve body 21 by a thermally insulating fastener 26. The thermally insulating fastener 26 may comprise portions which are made of a thermally conductive material as long as the contact between the fastener 26 and the valve body 21 or the control valve 2, respectively, is established via a thermally insulating portion of the fastener 26, such that the temperature sensor 25 is essentially thermally decoupled from the valve body 21. The temperature sensor 25 comprises a sensing unit 251 which forms an angled front part and extends into the flow 24. The sensing unit 251 may comprise a thermistor, a thermocouple etc. The temperature sensor 25 further comprises an electronic unit 252 comprising an electronic circuit for amplification and/or readout and which is spatially separated from the sensing unit 251, as indicated schematically by the two wavy lines. The sensing unit 251 is connected to the electronic unit 252 by cabling 253. The control valve 2 comprises a thermally insulating lead-through 27 which is arranged within the wall 211 of the valve body 21 and through which the cabling 253 is guided. The thermally insulating lead-through could, in other embodiments, also be arranged in a shaft of the valve regulating member (not shown in FIG. 2), for example, if the temperature sensor 25 is arranged within the valve regulating member. The thermally insulating lead-through 27 is made of a thermally insulating material, such as for example an adhesive, a foam, a plastic, or a ceramic.

In other embodiments, the wall of the valve body may be made of a thermally insulating material, such that a separate thermally insulating lead-through may not be necessary. In such a case, it may also not be necessary to require a thermally insulating fastener, since the wall of the valve body is thermally insulating.

Figure 3:
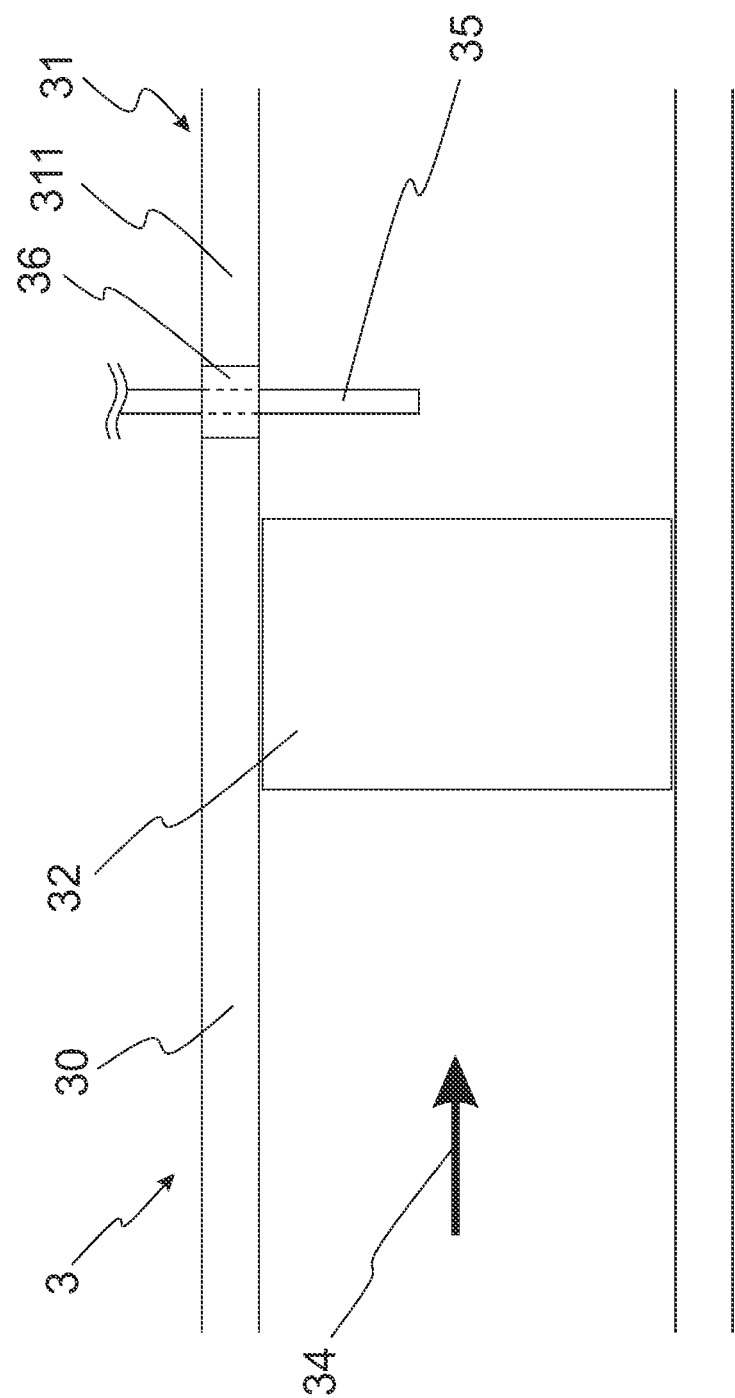
FIG. 3 shows a side cut view of a third embodiment of a control valve.

FIG. 3 shows a schematic side view of a third embodiment of a control valve 3 comprising a valve body 31 with a valve housing 30 and a valve regulating member 32 which regulates the fluid flow 34. The control valve 3 further comprises a temperature sensor 35 which is mounted in the control valve 3 by a thermally insulating fastener 36. The fastener 36 is mounted within the wall 311 of the valve body 31. The temperature sensor 35 is not angled in the front part and extends into the flow 34. The temperature sensor 35 is arranged downstream to the valve regulating member 32. In other embodiments, the temperature sensor 35 may be arranged upstream to the valve regulating member 32 or may be arranged within the valve regulating member 32.

Figure 4:
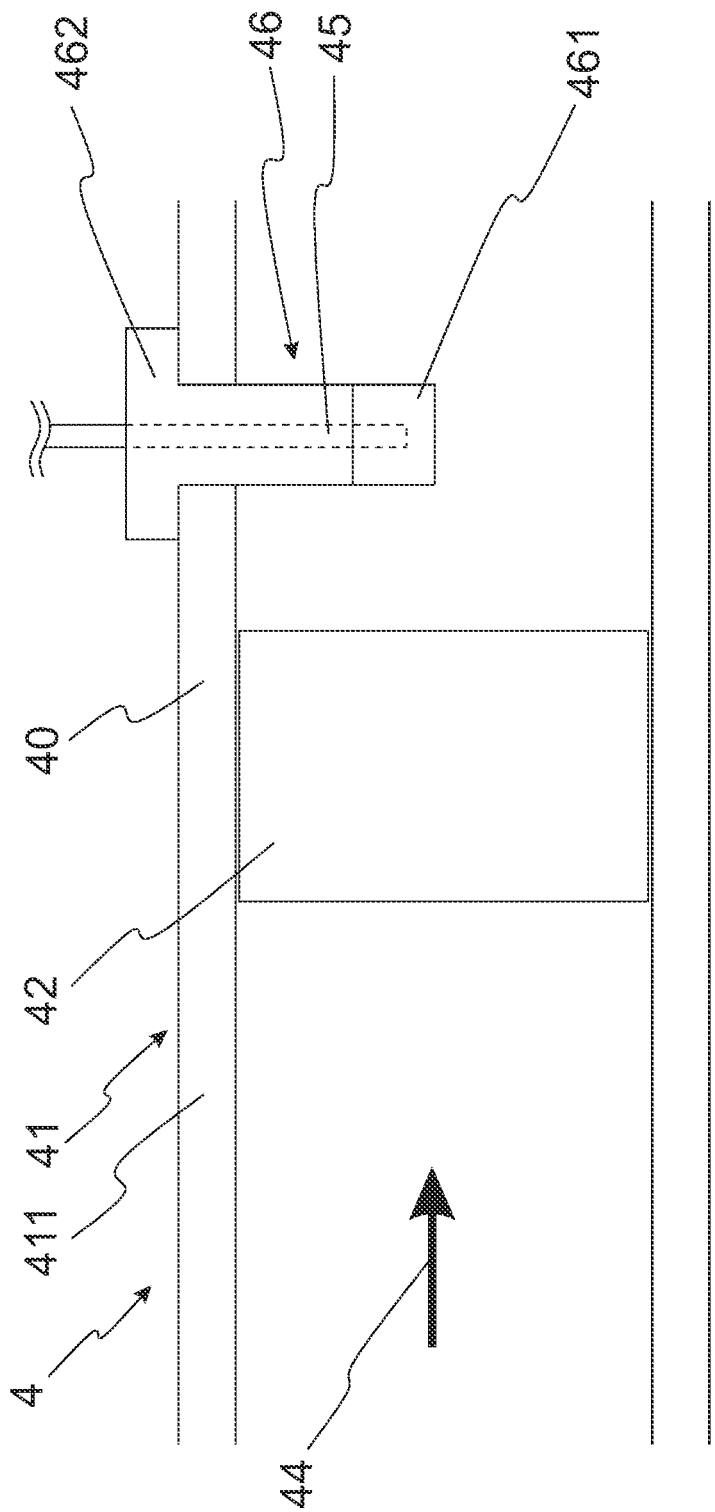
FIG. 4 shows a side cut view of a fourth embodiment of a control valve.

FIG. 4 shows a schematic side view of a fourth embodiment of a control valve 4 comprising a valve body 41 with a valve housing 40 and a valve regulating member 42 for regulating the fluid flow 44. The control valve 4 comprises a fastener which comprises a thermowell 46 configured to receive a temperature sensor 45 and is mounted in a bore of the wall 411 of the valve body 41. The thermowell 46 comprises a thermally insulating upper portion 462, which contacts the wall 411 of the valve body 41, and a lower portion 461 forming a thermally conductive head arranged in the interior space of the valve body 41. The lower portion or the head 461, respectively, is thermally coupled to the temperature sensor 45, such that the temperature sensor 45 can measure the temperature of the fluid 44. Due to the thermowell 46, the temperature sensor 45 can easily be exchanged without having to open the control valve 4.

Figure 5:
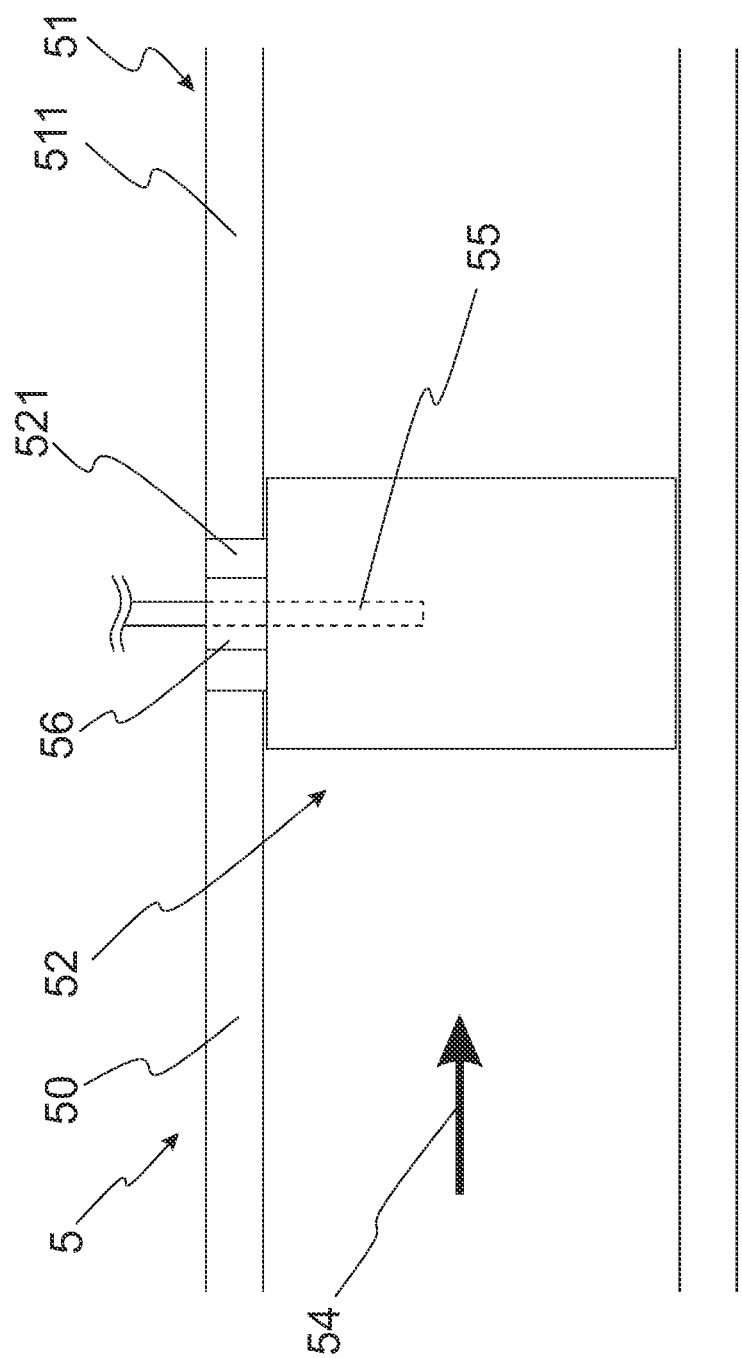
FIG. 5 shows a side cut view of a fifth embodiment of a control valve.

FIG. 5 shows a schematic side view of a fifth of a control valve 5 comprising a valve body 51 with a valve housing 50 and a valve regulating member 52 for regulating the fluid flow 54. The control valve 5 comprises a thermally insulating fastener 56 which is mounted within the valve regulating member 52, in particular, within a shaft 521 of the valve regulating member 52. The front part of the temperature sensor 55 is arranged within the valve regulating member 55. For a ball valve for example, the front part of the temperature sensor 55 may extend into the through bore of the ball and measure the temperature of the fluid flowing through the bore of the ball.

As described in the context of FIGS. 1 and 2, also in the embodiments of FIGS. 3, 4 and 5, the sensing unit of the temperature sensor is connected to a processing unit via a wired connection, e.g. electronic circuitry or cable, and/or via an electronic circuit for wireless communication.

LIST OF REFERENCE SYMBOLS 1, 2, 3, 4, 5 control valve
10, 20, 30, 40, 50 valve housing
11, 21, 31, 41, 51 valve body
111, 211, 311, 411, 511 wall
12, 22, 32, 42, 52 valve regulating member
521 shaft
13 axis of rotation
14, 24, 34, 44, 54 fluid flow
15, 25, 35, 45, 55 temperature sensor
251 sensing unit
252 electronic unit
253 cabling
16, 26, 36, 46, 56 fastener
27 lead-through
461 thermally conductive head
462 upper portion

The invention claimed is:

1. A control valve for regulating a fluid flow in an HVAC system, the control valve comprising:
a valve body and a temperature sensor configured to measure the temperature of a fluid flowing in the control valve,
wherein the temperature sensor is arranged such that the temperature sensor is essentially thermally decoupled from the valve body, and
wherein the temperature sensor is mounted in the control valve by an at least partially thermally insulating fastener,
the contact between the fastener and the valve body is established via a thermally insulating portion of the fastener,
the valve body comprises a valve regulating member, the valve regulating member being adjustable between a closed position and an open position to vary the fluid flow through the valve body,
the fastener is mounted on or within the valve regulating member such that a front part of the temperature sensor is arranged within the valve regulating member,
the fastener comprises a thermowell configured to receive the temperature sensor, and
the thermowell comprises a thermally conductive head arranged in an interior space of the valve body, the head being thermally coupled to the temperature sensor.

2. The control valve according to claim 1, wherein the fastener comprises at least one of: an adhesive, a foam, a plastic, and a ceramic.

3. The control valve according to claim 1, wherein the control valve comprises a thermally insulating lead-through configured to receive cabling connected to a sensing unit of the temperature sensor.

4. The control valve according to claim 3, wherein the thermally insulating lead-through is arranged within a shaft of the valve regulating member.

5. The control valve according to claim 1, wherein the temperature sensor comprises a circuit configured for wireless transmission of temperature information.

6. The control valve according to claim 1, wherein a portion of the valve body is thermally insulating.

7. The control valve according to claim 1, wherein the valve body is thermally insulating.

8. The control valve according to claim 1, wherein the temperature sensor comprises a thermistor or a thermocouple, and
the control valve comprises a thermally insulating lead-through configured to receive cabling connected to the thermistor or the thermocouple of the temperature sensor.

9. The control valve according to claim 1, wherein the temperature sensor comprises a front angled part that extends into the fluid flow, and
the control valve comprises a thermally insulating lead-through configured to receive cabling connected to the front angled part of the temperature sensor.

10. A control valve for regulating a fluid flow in an HVAC system, the control valve comprising:
a valve body and a temperature sensor configured to measure the temperature of a fluid flowing in the control valve,
wherein the temperature sensor is arranged such that the temperature sensor is essentially thermally decoupled from the valve body,
the temperature sensor is mounted in the control valve by an at least partially thermally insulating fastener,
the contact between the fastener and the valve body is established via a thermally insulating portion of the fastener,
the valve body comprises a ball with a through bore, the ball with the through bore being adjustable between a closed position and an open position to vary the fluid flow through the valve body,
the fastener is mounted on or within the ball with the through bore such that a front part of the temperature sensor is arranged to extend into the through bore,
the fastener comprises a thermowell configured to receive the temperature sensor, and
the thermowell comprises a thermally conductive head arranged in an interior space of the valve body, the thermally conductive head being thermally coupled to the temperature sensor.

* * * * *